Figure 1:
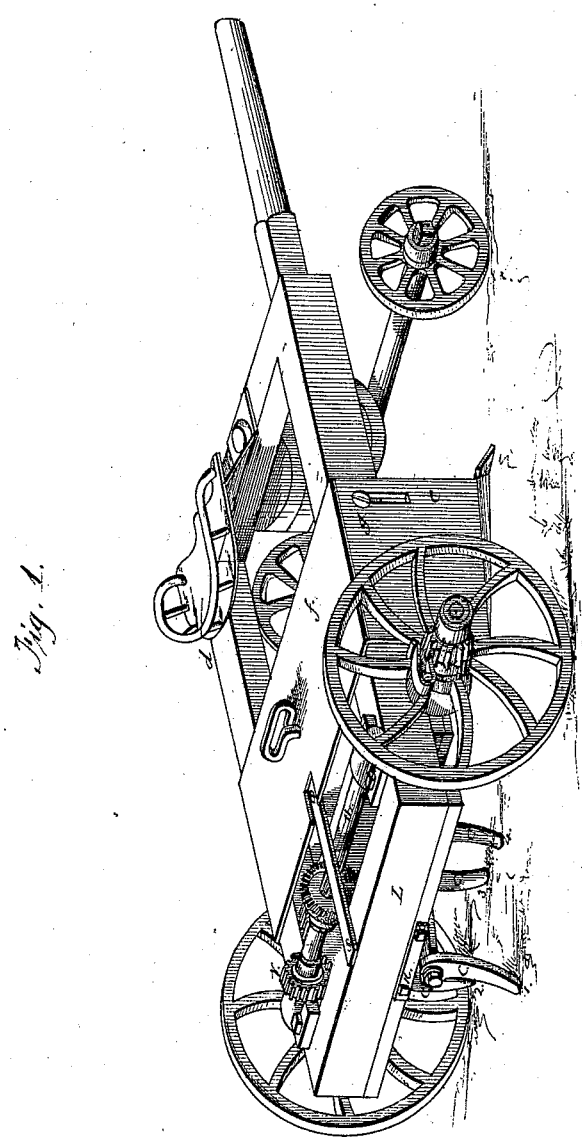

C. DARLING.
Potato Digger.

No. 107,229.

2 Sheets—Sheet 1.

Patented Sept. 13, 1870.

Witnesses:
Wm Baker
Lewis Bradley

Inventor:
Cook Darling

C. DARLING.
Potato Digger.
No. 107,229. Patented Sept. 13, 1870.
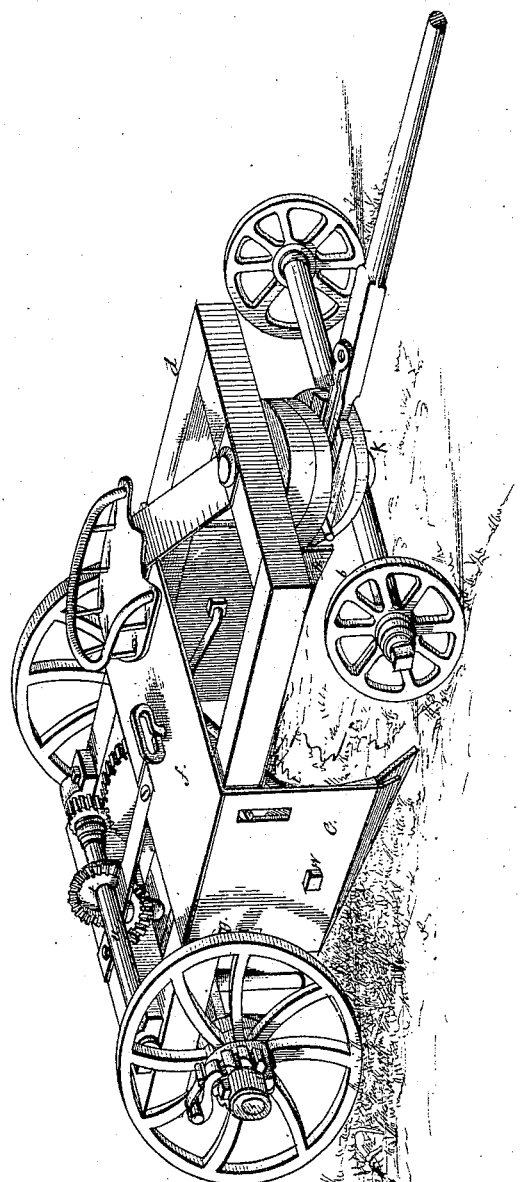
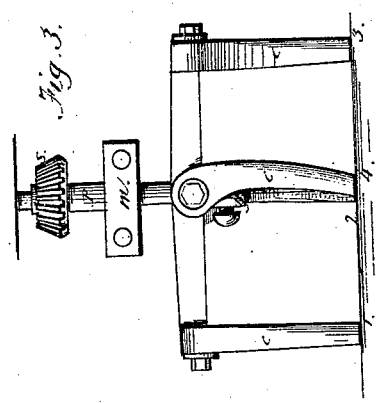
Witnesses:
Wm Baker
Lewis Bradley
Inventor:
Cook Darling

United States Patent Office.

COOK DARLING, OF UTICA, NEW YORK.

Letters Patent No. 107,229, dated September 13, 1870.

IMPROVEMENT IN POTATO-DIGGERS.

The Schedule referred to in these Letters Patent and making part of the same

Be it known that I, COOK DARLING, of the city of Utica, in the State of New York, have invented an Improved Potato-Digger, of which the following is a specification.

The machinery of my potato-digger is borne on a four-wheeled carriage, to be drawn by two horses or other animals, the center of the carriage over the row to be dug, and the wheels passing on each side thereof.

The machinery designed to perform the desired work is two-fold; the first, to loosen the ground in connection with the potatoes, and the second following after to rake them out, and leave them on the surface.

In the annexed drawing—

Figures 1 and 2, each represent perspective elevation of the entire machine.

Figure 2, being a front view, is designed especially to show the shares or blades $a$ and $b$, which pass under the surface on either side of the row, loosening up the whole mass.

Fig. 1 is a rear view, exhibiting the revolving raker C, which following in the rear of the shares, and having a quick circular motion, its teeth, 1 2 3 4, thoroughly stir the ground previously loosened by the shares, raking out the potatoes in a manner not unlike the work of the hand by the use of the hoe.

The wooden frame $d$ is sufficiently shown in the drawing.

The metal-plate $e\ f$ is lapped over the frame, and, coming down on each side, the lower edges are turned inward to receive the shares which are riveted to the plate, as seen at $h\ h$.

There is also a bent bracing-rod, a portion of which is seen at W, (fig. 2,) passing from one of these plates to the other, and secured at each side, to prevent the springing of these plates.

Screws, $g$, on each side, hold the plate to the frame. These screws being loosened, the plate with the shares attached is raised, or lowered as may be desired.

The shares are thin, narrow and flat, with curved front edges; the heels, as at $i$, are not in contact with each other, but space is left for the earth, vines, or weeds to pass, and one is a little in rear of the other, yet the extreme points $k\ k$ are opposite each other, making one a little shorter than the other.

The revolving raker, in the rear, is separately shown in fig. 3. It is attached to the beam L of the carriage-frame by means of the block $m$, the latter lying immediately in rear of this beam, and is bolted to it by the thorough-bolts $n\ o$.

The raker revolves around its shaft P, which, passing loosely through the block $m$, holds the raker by means of the thimble and set-screw $y$, upon its lower end.

The raker being thus affixed, the pinion S is brought in connection with the wheel $t$, on the horizontal shaft $u$.

This horizontal shaft has also the spur-wheel V, fig. 2, which connects with a wheel on the main wheel shaft of the carriage. Revolving motion is thus communicated to the raker by the movement of the carriage.

The remainder of the arrangement of the machinery and carriage is sufficiently shown in the drawing.

I claim as new and of my invention—

A potato-digger, constructed as described, combining the shares $a\ b$, as described, for loosening up the ground and the potatoes, as described, and the revolving raker in the rear for further stirring the ground and raking out the potatoes, as described, the whole being constructed, arranged, and combined substantially as herein set forth.

COOK DARLING.

Witnesses:
WILLIAM BAKER,
HENRY BARNUM.